Aug. 4, 1970     W. H. KNAPP     3,522,693
BEARING GUARD WITH STATIONARY AND ROTATABLE KNIFE MEMBERS
Filed Aug. 12, 1968     2 Sheets-Sheet 2

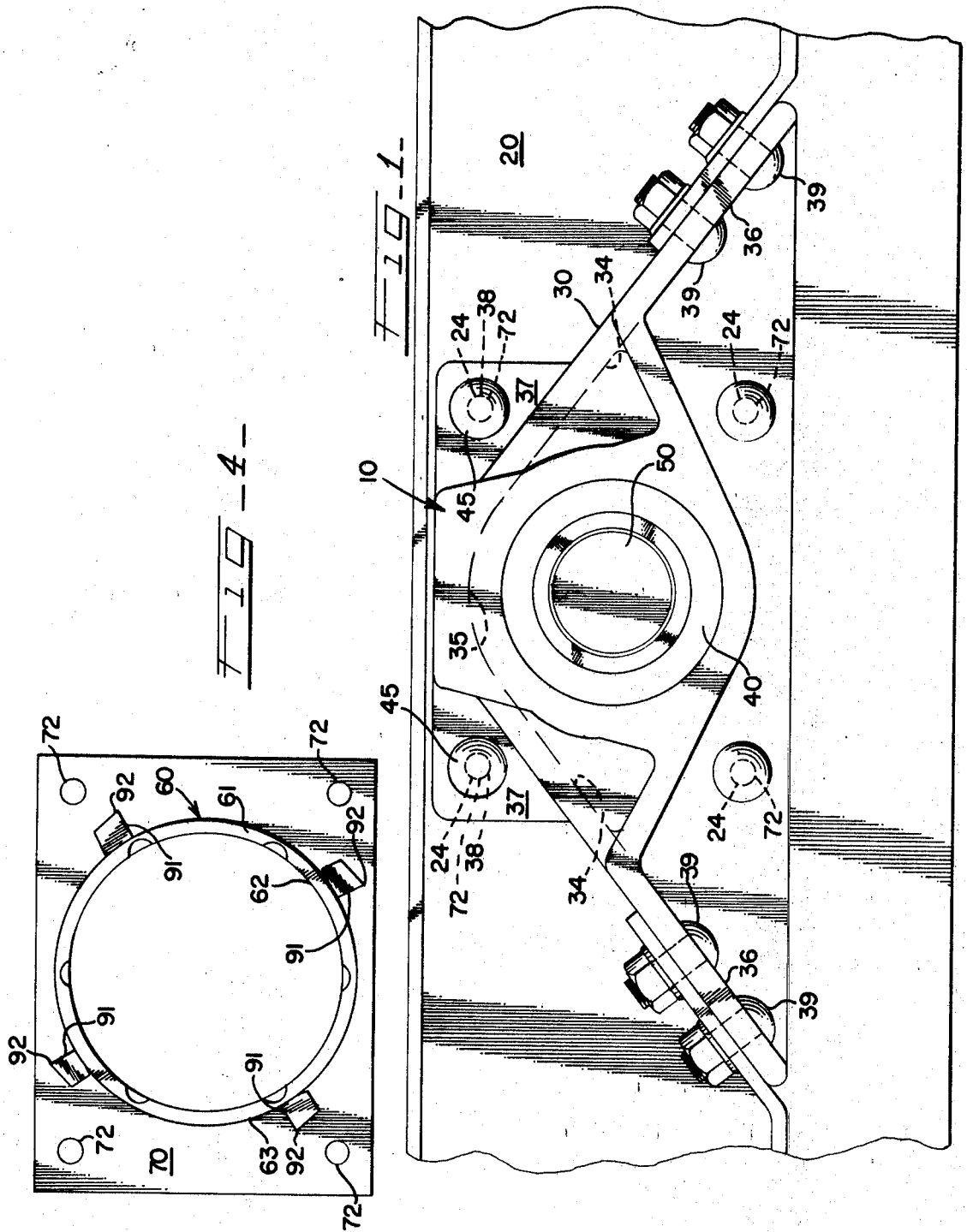

INVENTOR
WILLIAM H. KNAPP

United States Patent Office 3,522,693
Patented Aug. 4, 1970

3,522,693
BEARING GUARD WITH STATIONARY AND ROTATABLE KNIFE MEMBERS
William H. Knapp, Davenport, Iowa, assignor to International Harvester Company, Chicago, Ill., a corporation of Delaware
Filed Aug. 12, 1968, Ser. No. 751,807
Int. Cl. A01d 73/00
U.S. Cl. 56—1                                                11 Claims

ABSTRACT OF THE DISCLOSURE

An apparatus for guarding a harvesting machine bearing against contamination by straw and other vegetation. The bearing is spaced from its supporting wall to permit any material that negotiates the labyrinth seal to be expelled to the atmosphere before encountering the bearing.

BACKGROUND OF THE INVENTION

This invention relates generally to improvements in bearing guards and the like and more particularly to a new and improved guard for protecting a bearing on an agricultural machine.

The bearings used on agricultural machines are one of the controlling factors in the machine's useful life. These bearings generally operate in a moist and dirty atmosphere which contributes to their critical nature. In the past, most rotating elements of agricultural machines rotated at relatively low rates. However, the machines now being designed have elements that rotate at much higher rates. This change has made the bearings even more critical than they were in the past.

It has been the practice to provide a rubber or labyrinth type seal between a bearing and a dirt environment in an effort to keep the contacting surfaces of the bearing clean. Seals such as this must be made to close tolerances and are susceptible to damage and wear. In agricultural-type machines it is not necessary that these seals prevent the loss of material since the small amount of material likely to escape through such a seal would be inconsequential as compared to the volume of material handled by the machine. Considerable damage is caused to seals of this type when debris manages to penetrate but not pass through the seal. A conventional sealed bearing of this type will normally be exposed to any material that manages to negotiate past the seal since it has no other place to go.

SUMMARY OF THE INVENTION

The general purpose of this invention is to provide a guard for the bearing on an agricultural machine which embraces all the advantages of similarly employed guards and possesses none of the aforedescribed disadvantages. To attain this, the present invention contemplates a unique labyrinth seal arrangement and the provision for means to dispose of any material that negotiates the seal. This is accomplished by a bearing support that spaces a bearing outwardly a sufficient distance that any material passing the seal has the opportunity to be discharged to the atmosphere before reaching the contacting surfaces of the bearing. The seal utilized in this invention is of the labyrinth type and it is unique in that its rugged construction does not require close tolerances and enables it to withstand considerable abuse. Furthermore, the seal has an adjustable cutting means that functions to prevent the accumulation of material around the seal. The labyrinth seal is further unique in that it includes means for breaking up material within the confines of the seal.

The object of this invention is to prevent the accumulation of material adjacent the bearings of agricultural machines, to keep the bearing seals open and thus operative and to dispose of any material that passes through the seal before it reaches the bearing.

BRIEF DESCRIPTION OF THE DRAWING

FIG. 1 is an end view of the shaft, the bearing and the bearing support;
FIG. 2 is a cross-sectional view of FIG. 1;
FIG. 3 is a side view of the sleeve isolated from the bearing support;
FIG. 4 is an end view of the sleeve shown in FIG. 3; and
FIG. 5 is a view of the mounting plate and sleeve.

DESCRIPTION OF THE PREFERRED EMBODIMENT

Referring now to the drawings wherein like reference characters designate like or corresponding parts throughout the several views, there is shown in FIG. 1 a bearing trash guard designated 10 mounted on a vertical wall 20. As can be best seen in FIG. 2, the vertical wall 20 has an outer surface 21 and an inner surface 22. A circular aperture 23 is formed in the wall 20. The wall 20 represents a wall that would be found in an agricultural machine upon which a rotating shaft is supported.

A bearing support 30 as best seen in FIG. 1 is secured by nuts and bolts 39 to the outer surface 21 of the wall 20. The bearing support 30 includes an inverted V-shaped top wall formed of diverging legs 36 that intersect at an apex 35. The bearing support 30 also includes a mounting plate 37 that has a pair of mounting holes 38 formed therein. As can be best seen in FIG. 2, the bearing support 30 has a bearing seat 31 formed therein. The bearing seat 31 is spaced outwardly from the mounting plate 37 and there is a cavity 33 formed therebetween. The legs 36 of the inverted V-shaped top wall 34 form the upper surface of the cavity 33.

As can be best seen in FIGS. 2 through 5 inclusive, the seal is formed of a sleeve 60 having an inner surface 62 and an outer surface 63. A mounting plate 70 having a circular opening 71 is telescoped over the sleeve 60 and secured thereto. The mounting plate 70 has mounting holes 72 formed therein. The mounting holes 72 are positioned so that they are in alignment with the mounting holes 38 of the bearing support and also with mounting holes 24 formed in the wall 20. The mounting plate 70 is positioned on the sleeve 60 such that there is a short extension of the sleeve that will extend through the aperture 23 formed in the wall 20 when the mounting plate 70 is mounted on the inner surface 22 of the wall 20. This short extension protrudes through aperture 23 and beyond the outer surface 21 of wall 20 such that it bridges all of the mating surfaces of the bearing support 30, vertical wall 20 and the mounting plate 70. This provides a smooth flow path for material passing through aperture 23. The sleeve 60 protrudes from the inner surface 22 of the wall 20 terminating in a free end 61. There are a plurality of interrupting notches 64 formed along the inner surface 62 of the sleeve adjacent the free end 61.

A bearing 40 is carried in the bearing seat 31 of the bearing support. Shaft 50 having a peripheral surface 51 is rotatably supported by the bearing 40 about axis A—A. There are a plurality of blades 80 secured to the shaft 50 extending tangentially from the peripheral surface 51. Each of the blades 80 has a radial edge 81 that substantially parallels the inner surface 22 of the wall 20. A U-shaped notch 82 is formed in each of the blades 80 along the radial edge 81 that is adapted to receive the free end 61 of the sleeve 60. The U-shaped notch has an outer leg 83, an inner leg 84 and a bight portion 85.

A plurality of stationary knives are secured to the outer surface 63 of the sleeve 60. Each of the stationary knives has a first cutting edge 91 extending generally radial to axis A—A and a second cutting edge 92 that extends generally parallel to axis A—A.

There is an adjustable knife 95 mounted on each of the blades 80 adjacent the outer leg 83 of the U-shaped notch. The adjustable knife blades 95 have elongated slots 96 formed therein. Screws or other fastening means 97, extend through the elongated slots 96 for securing the knives 95 in selected positions on the blades 80. A cutting edge 98 is provided on two sides of the knives 95 one of which is adjusted so that it cooperates with the cutting edges 92 to sever material upon rotation of the shaft 50. When one cutting edge 98 of a knife 95 becomes dull, the screws 97 can be removed and the other cutting edge 98 arranged so that it can be used.

This bearing guard is intended for use in agricultural machines wherein the wall 20 represents a confining wall of a machine in which agricultural products are being processed. The shaft 50 is supported by the containing wall 20 and has a tool of some type, such as an impeller blade, connected to it that functions to process the agricultural material in the machine. As a result of the threshing and agitation that is created within the machine, there is large amounts of straw, vines and other deris that have a tendency to collect and warp around a shaft between the wall and the blade or other working tool carried by the shaft. With applicant's invention, any long material such as straw that pinwheels around the sleeve 60 will gradually work its way towards the free end 61 of the sleeve and into the U-shaped notch 82. Once material has entered the U-shaped notch 82, it will be cut by either the first cutting edge 91 or the second cutting edge 92. Thus by cutting the pinwheeled piece of straw at its bight portion, the severed pieces will be free to dislodge themselves. There will, of course, be some material that manages to negotiate its way between the inner surface 62 of the sleeve and the peripheral surface 51 of the shaft 50. This material is free to move through the sleeve towards the bearing. However, when the material reaches the end of the sleeve, it will enter the cavity 33 from which it will be discharged by gravity or centrifugal force before it actually reaches the bearing 40. Thus the sleeve 60 which functions as a seal to protect the bearing 40 against debris is unique in that any material that does manage to pass the seal will be discharged before it reaches the bearing. Material that pinwheels over the inner leg 84 of the U-shaped notch will encounter the interrupting notches 64 formed on the inner surface 62 of the sleeve 60 and this material will be cut or shredded in this way. The gap between the inner surface 62 and the legs 84 of the blades will thus be maintained clear so that the shaft will be free to rotate.

What is claimed is:

1. In a bearing trash guard comprising a wall having an outer and an inner surface, an aperture formed in said wall, a bearing support secured to the outer surface of said wall adjacent said aperture, said bearing support having a bearing seat formed therein, a bearing carried by said bearing seat, said bearing support having a cavity formed therein in communication with said aperture and open to the atmosphere surrounding said bearing support, said bearing seat located on said bearing support such that said cavity is located between it and said outer surface, a sleeve mounted on said wall, encompassing said aperture, and protruding from said inner surface, said sleeve having a free end spaced from the inner surface of said wall, a shaft carried by said bearing for rotating about an axis extending through said aperture and said sleeve, a plurality of blades secured to said shaft, said blades having generally radial edges spaced from the inner surface of said wall, a U-shaped notch formed in said radial edges such that the U-shaped notch is adapted to receive the free end of said sleeve.

2. The invention as set forth in claim 1, wherein said cavity is open to the atmosphere only along the bottom sector.

3. The invention as set forth in claim 1, wherein interrupting notches are formed in the free end of said sleeve along the internal surface thereof.

4. The invention as set forth in claim 1, wherein a stationary knife is secured to the outer surface of said sleeve, said knife having a first cutting edge substantially parallel to said axis and a second cutting edge substantially normal to said axis, a rotary knife adjustably carried by one of said blades adjacent the outer leg of said U-shaped notch for cooperation with said first cutting edge, said second cutting edge located such that it cooperates with the bight portion of said U-shaped notch.

5. The invention as set forth in claim 1, wherein said cavity has an inverted V-shaped top wall which functions as a trash shedding surface, the apex of said V-shaped wall overlies said axis and is spaced from the peripheral surface of said shaft, the legs of said V-shaped top wall diverge at an angle such that a relatively large space is maintained between the top wall and the peripheral surface of said shaft.

6. The invention as set forth in claim 3, wherein said cavity has an inverted V-shaped top wall which functions as a trash shedding surface, the apex of said V-shaped wall overlies said axis and is spaced from the peripheral surface of said shaft, the legs of said V-shaped top wall diverge at an angle such that a relatively large space is maintained between the top wall and the peripheral surface of said shaft.

7. The invention as set forth in claim 4, wherein said cavity has an inverted V-shaped top wall which functions as a trash shedding surface, the apex of said V-shaped wall overlies said axis and is spaced from the peripheral surface of said shaft, the legs of said V-shaped top wall diverges at an angle such that a relatively large space is maintained between the top wall and the peripheral surface of said shaft.

8. The invention as set forth in claim 2, wherein interrupting notches are formed in the free end of said sleeve along the internal surface thereof .

9. The invention as set forth in claim 2, wherein a stationary knife is secured to the outer suface of said sleeve, said knife having a first cutting edge substantially parallel to said axis and a second edge substantially normal to said axis, a rotating knife adjustably carried by one of said blades adjacent the outer leg of said U-shaped notch for cooperation with said first cutting edge, said second cutting edge located such that it cooperates with the bight portion of said U-shaped notch.

10. The invention as set forth in claim 3, wherein a stationary knife is secured to the outer surface of said sleeve, said knife having a first cutting edge substantially parallel to the said axis and a second cutting edge substantially normal to said axis, a rotating knife adjustably carried by one of said blades adjacent the outer leg of said U-shaped notch for cooperation with said first cutting edge, said second cutting edge located such that it cooperates with the bight portion of said U-shaped notch.

11. The invention as set forth in claim 1 wherein a sleeve mounting plate having a sleeve receiving opening formed therein is secured to said sleeve, said sleeve mounting plate extends radially from the outer surface of said sleeve such that it is adapted to mount flush against the inner surface of said wall, said sleeve extends from said sleeve mounting plate outwardly toward said bearing seat through said aperture and beyond the outer surface of said wall such that a smooth flow path is formed by the inner surface of the sleeve through said wall.

References Cited

UNITED STATES PATENTS

| | | | |
|---|---|---|---|
| 2,787,108 | 4/1957 | Meltzer | 56—25.4 |
| 2,910,819 | 11/1959 | Helliwell | 56—220 |
| 3,415,043 | 12/1968 | Shones | 56—25.4 |
| 3,431,032 | 3/1969 | Haentjens | 308—15 |

FOREIGN PATENTS

| | | |
|---|---|---|
| 1,066,795 | 10/1959 | Germany. |
| 87,890 | 6/1956 | Norway. |

LOUIS G. MANCENE, Primary Examiner

J. N. ESKOVITZ, Assistant Examiner

U.S. Cl. X.R.

308—15